United States Patent [19]

Driggers

[11] Patent Number: 4,825,548
[45] Date of Patent: May 2, 1989

[54] VIBRATION-DAMPING CONTROL HANDLE FOR A PORTABLE POWER TOOL

[75] Inventor: Bernard M. Driggers, Shreveport, La.

[73] Assignee: White Consolidated Industries, Inc., Cleveland, Ohio

[21] Appl. No.: 32,772

[22] Filed: Mar. 31, 1987

[51] Int. Cl.[4] ............................................. A01D 35/76
[52] U.S. Cl. .................................. 30/276; 30/DIG. 5; 30/296 R; 56/12.7; 173/162.2
[58] Field of Search ............... 30/276, 296 R, DIG. 5; 56/12.7; 173/162.1, 162.2

[56] References Cited

U.S. PATENT DOCUMENTS

| | | | |
|---|---|---|---|
| 3,092,374 | 6/1963 | Krekeler | |
| 3,140,746 | 7/1964 | Force | 173/162 |
| 3,224,473 | 12/1965 | Dobbertin et al. | |
| 3,372,718 | 3/1968 | Irgens | |
| 3,409,056 | 11/1968 | Rauh | |
| 3,525,373 | 8/1970 | Kobayashi | |
| 3,530,909 | 9/1970 | Scharpf | |
| 3,542,095 | 11/1970 | Frederickson | |
| 3,581,832 | 6/1971 | Heermann et al. | 173/162 |
| 3,620,269 | 11/1971 | Lange | |
| 3,637,029 | 1/1972 | Sherwood, Jr. et al. | 173/162 |
| 3,651,839 | 3/1972 | Stihl et al. | |
| 3,652,074 | 3/1972 | Frederickson | 267/137 |
| 3,680,608 | 8/1972 | Emmerich et al. | |
| 3,698,455 | 10/1972 | Frederickson et al. | |
| 3,700,015 | 10/1972 | Kobayashi et al. | |
| 3,728,793 | 4/1973 | Makinson et al. | 30/383 |
| 3,733,700 | 5/1973 | Notaras et al. | 30/381 |
| 3,772,784 | 10/1973 | Heerman | 30/382 |
| 3,813,776 | 6/1974 | Frederickson et al. | 30/381 |
| 3,845,557 | 11/1974 | Bailey | 30/381 |
| 3,849,883 | 11/1974 | Kolorz | |
| 3,889,763 | 6/1975 | Dillon | 173/162 |
| 3,911,580 | 10/1975 | Bailey | 30/381 |
| 3,918,534 | 11/1975 | Fogelholm | 173/162 |
| 3,934,344 | 1/1976 | Inaga | 30/381 |
| 3,945,119 | 3/1976 | Nagashima et al. | 30/383 |
| 3,972,119 | 8/1976 | Bailey | 30/381 |
| 4,010,544 | 3/1977 | Siman | 30/381 |
| 4,041,606 | 8/1977 | Thompson | 30/381 |
| 4,135,301 | 1/1979 | Hoeppner | 30/381 |
| 4,138,812 | 2/1979 | Zimmerer et al. | 30/381 |
| 4,141,143 | 2/1979 | Hirschkoff et al. | 30/381 |
| 4,188,719 | 2/1980 | Hoff | 30/276 X |
| 4,198,752 | 4/1980 | Bross | 30/381 |
| 4,202,096 | 5/1980 | Nagashima | 30/381 |
| 4,236,310 | 12/1980 | Müller | 30/276 |
| 4,451,983 | 6/1984 | Johnson et al. | 56/12.7 X |
| 4,578,863 | 4/1986 | Laverick | 30/276 |
| 4,696,108 | 9/1987 | Zerrer et al. | 30/276 |

OTHER PUBLICATIONS

Poulan Chain Saw parts list–Model 3400–2/80.
Dolmar (the New Chain Saw Generation Dolmar 144).
Partner R18–printed in Sweden.
Homelite (Jacobson).
Weed Eater (Lawn & Garden Tools 1984), Beaird–Poulan/Weed Eater–Emerson Electric Co.-8/83.

Primary Examiner—Frank T. Yost
Assistant Examiner—Michael D. Folkerts
Attorney, Agent, or Firm—Hubbard, Thurman, Turner & Tucker

[57] ABSTRACT

A vibration-damping control handle connectble to the shaft portion of a portable power tool, such as a flexible line trimmer or the like, has an elongated, generally tubular vibration isolation section which coaxially circumscribes the shaft. A first end portion of the vibration isolation section is clmaped to the shaft so that the balance of the section is cantilevered relative to the shaft and defines therewith an annular clearance space. The inner end of a handgrip connecting section is secured to a second end portion of the vibration isolation section, the connecting section projecting laterally outwardly from the vibration isolation section and having an operator handgrip secured to its outer end. During operation of the tool, transverse shaft vibration is absorbed by the vibration isolation section to thereby isolate the handgrip from a substantial portion of such vibration. The vibration isolation section also functions as a cantilevered spring element which may be laterally flexed into engagement with the shaft to exert a stronger lateral control force on the shaft, the shaft acting as a stop to limit such lateral flexure.

37 Claims, 5 Drawing Sheets

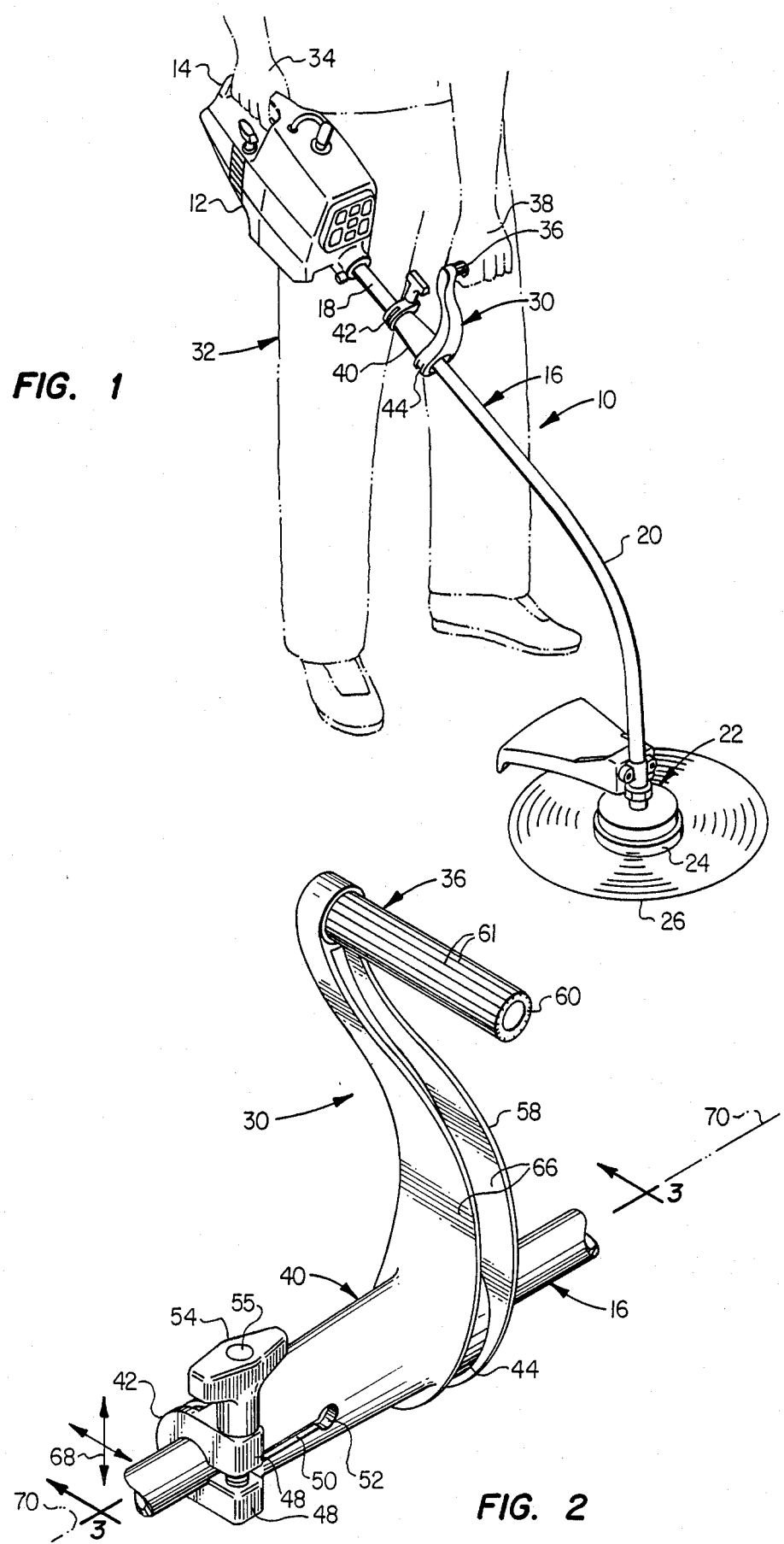

VIBRATION-DAMPING CONTROL HANDLE FOR A PORTABLE POWER TOOL

BACKGROUND OF THE INVENTION

The present invention relates generally to portable power tools, and more particularly provides a unique vibration-damping control isolation system for use on portable rotary cutting tools such as flexible line trimmers, lawn edgers, or brush cutters, and other portable rotary power tools such as snow throwers, shaft mounted blowers and the like.

Portable rotary cutting tools of the type mentioned are typically provided with a small internal combustion engine or electric motor which is connected to and spaced apart from a rotationally driven cutting element by an elongated hollow shaft through which drive shaft means extend for transmitting rotational power from the engine or motor to the cutting element. Such tools are also typically provided with a rear support handle connected to the engine or the shaft, and a forward control handle secured to the shaft. During operation of the tool, the operator grasps these handles to enable him to support the tool and appropriately guide the rotary cutting element. In conventional power tools of this type, the forward control handle is rigidly connected to the shaft and projects generally laterally outwardly therefrom. During tool operation, transverse shaft vibration is transmitted outwardly through the control handle to the handgrip portion thereof which is actually grasped by the tool operator. As is well known, such vibration transmitted to the handgrip can render operation of the tool, especially when it is used for extended continuous periods, quite uncomfortable, often causing a numbing sensation in the operator's hand.

Various attempts have been previously made to isolate the handgrip portion in the forward control handle from this shaft vibration. For example, it has been a common practice to utilize resilient bushings to connect the handgrip portion to the balance of the forward control handle, or to use such resilient bushings at the connection point between the forward control handle and the shaft. However, these isolation techniques typically result in only a relatively small reduction in the shaft vibration ultimately transmitted to the handgrip.

Another proposed solution has been to provide the forward control handle with an open-looped configuration in which one of the loop ends is rigidly connected to the shaft, with the other loop end being free so that the handgrip portion defines a generally central section of the open loop. This control handle configuration renders the overall handle somewhat more flexible, thereby providing a slight additional reduction in the shaft vibration transmitted to the operator handgrip.

However, each of these conventional control handle designs, in common with other conventional handle designs, still often transmit an undesirably high amount of shaft vibration to the operator handgrip.

It is accordingly an object of the present invention to provide an improved shaft-mounted control handle which will more substantially diminish shaft vibration transmitted to its handgrip portion.

SUMMARY OF THE INVENTION

In carrying out principles of the present invention, in accordance with a preferred embodiment thereof, an improved vibration-damping control handle is provided for connection to a vibration-prone power tool shaft. The control handle has an elongated, generally tubular cantilever spring portion which coaxially circumscribes the shaft. A first end portion of the spring section is rigidly connected to the shaft by means of a suitable clamping mechanism, with the balance of the spring section being normally laterally spaced apart from and isolated from the shaft. Molded integrally with, or otherwise suitably secured to the opposite end portion of the spring section, is a handgrip section which comprises a handle, handlebar or bullhorn connecting section that projects laterally outwardly from the spring section. At the outer end of the connecting section is an operator handgrip which extends generally perpendicularly to the connecting section. The handgrip section may be fixed or positionally adjustable relative to the spring portion.

During operation of the power tool, transverse shaft vibration is transmitted to the spring section via its end portion rigidly connected to the shaft. The laterally flexible, isolated balance of the spring section functions to effectively absorb and damp a very substantial portion of the shaft vibration transmitted thereto, thereby greatly diminishing the amount of shaft vibration transmitted to the handgrip portion of the handle via its axially offset connecting section.

As previously mentioned, during normal operation of the tool, the non-clamped portion of the elongated cantilever spring section is isolated from the shaft portion which it circumscribes. However, when it is necessary to exert a substantial force on the handgrip which is transverse to the shaft, the shaft acts as a stop to limit lateral flexure of the spring section relative to the shaft This, in turn, limits the bending stress which can be imposed on the laterally flexible spring section to prevent its breakage during hard use of the tool. Additionally, the tubular spring section, which defines an axial offset in the control handle, provides the handle with enhanced safety features compared to conventional handles in which the inner end of the connecting section is simply rigidly clamped to the shaft. For example, if the handle clamping mechanism breaks, the balance of the tubular spring section still functions to maintain a connection between the handle connecting section and the shaft, thereby maintaining at least limited degree of hand control of the shaft until the tool's engine can be shut off. Additionally, even if a longitudinally intermediate portion of the spring section breaks during use of the tool, a remaining section of the spring portion will still maintain connection between the connecting member and the shaft.

According to another feature of the present invention, an annular resilient cushioning member may be operatively secured to the handgrip end portion of the spring section. The cushioning member outwardly circumscribes the shaft to define a resilient stop between such end portion and the shaft. When the resilient cushioning member is bottomed out against the shaft in response to a relatively large force on the handgrip portion of the handle, the resilient element engages the shaft and absorbs vibration therefrom which would otherwise be transmitted to the handle connecting section via the bottomed-out spring section.

The unique vibration-damping control handle of the present invention may be conveniently and economically constructed in a one-piece fashion from a suitable lightweight material such as molded plastic. Alternatively, and according to another feature of the present invention, the handle connecting section may be formed separately from the spring section and removably secured thereto in a manner permitting selective positional adjustment of the handle connecting section relative to the spring section. In an alternate embodiment of the handle, this positional adjustment capability is achieved by providing the handgrip end portion of the spring section with a generally spherical outer surface curvature, and forming on the handle connecting section a split annular clamping band portion having a radially inner surface with a curvature complementary to that of the spherical outer surface of the spring section. The clamping band may thus be secured around the spherical outer surface in any desired location thereon to thereby permit the handgrip to be axially, laterally and rotationally repositioned relative to the spring section.

The control handle may be easily clamped to the power tool shaft, at an adjustable axial location thereon, by a variety of clamping means. In one embodiment of the handle, a clamping screw is built into the shaft connection end of the cantilever spring section. Alternatively, the handle could be provided with a conventional molded "U" clamp, or a separate metal "U" clamp, and associated bolt to clamp the handle to the shaft. In another embodiment of the handle, the shaft-connection end of the spring section is externally threaded, and an internally threaded annular clamping collar is provided to be threaded onto the spring connecting end to tighten it onto the shaft.

In addition to significantly enhancing the operator hand comfort during use of the power tool, the improved control handle also provides increased operating safety, and may be easily and relatively inexpensively formed as a unitary structure, or as a two-piece adjustable handle as described above.

BRIEF DESCRIPTION OF THE DRAWINGS

FIG. 1 is a perspective view of a representative gasoline-powered rotary cutting tool which incorporates therein a vibration-damping control handle that embodies principles of the present invention;

FIG. 2 is an enlarged scale perspective view of the control handle and a portion of the power tool shaft to which it is secured;

DETAILED DESCRIPTION

Figure 3:
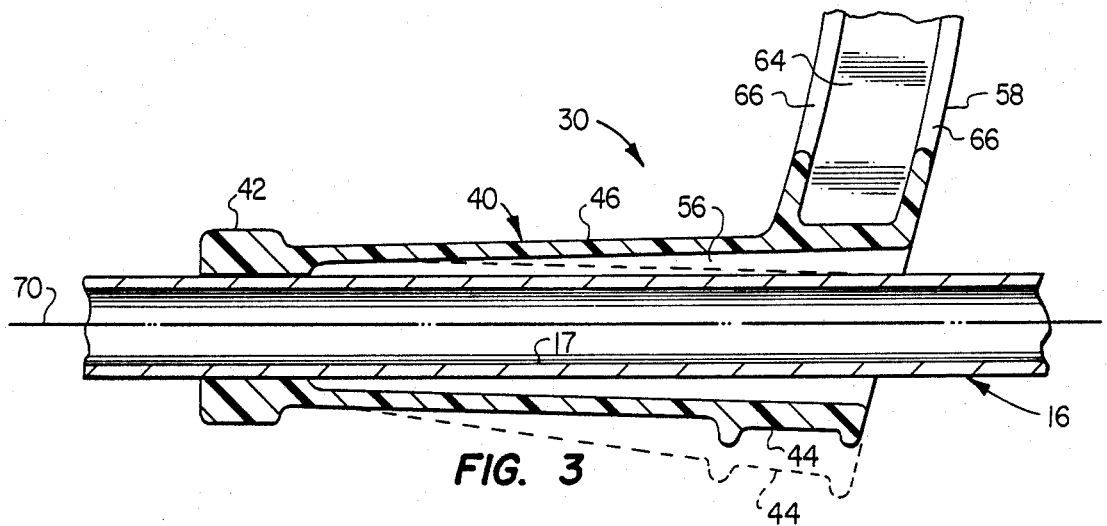
FIG. 3 is an enlarged scale fragmentary cross-sectional view through the control handle and a portion of the power tool shaft taken along line 3—3 of FIG. 2.
Figure 4:
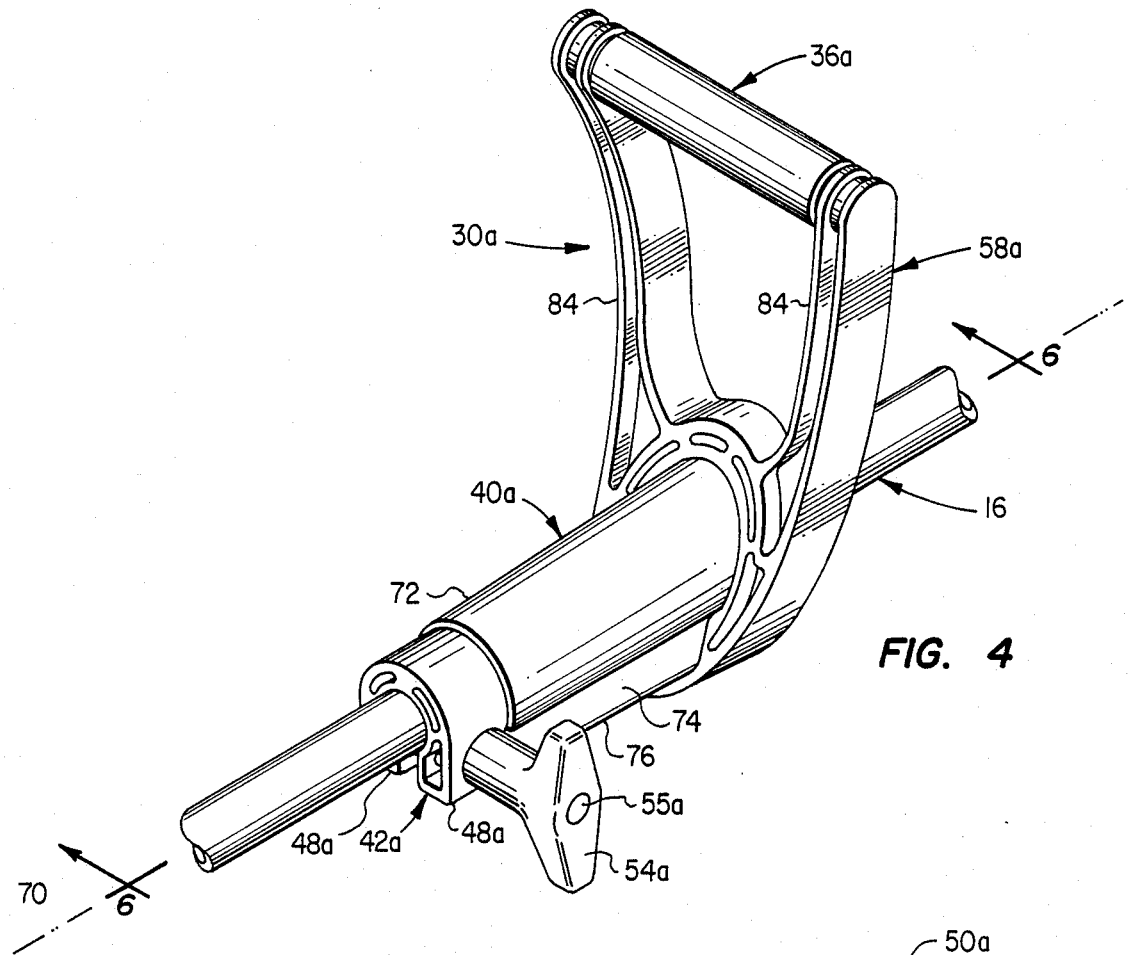
FIG. 4 is a perspective view similar to that in FIG. 2, but illustrates an alternate embodiment of the control handle.
Figure 5:
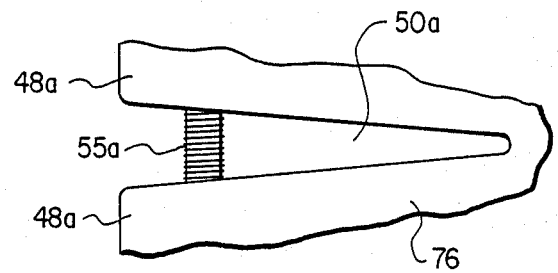
FIG. 5 is an enlarged scale fragmentary bottom plan view of an attaching or clamping end portion of the handle in FIG. 4.

Perspectively illustrated in FIG. 1 is a representative portable rotary cutting tool in the form of a gasoline-powered flexible line trimmer 10 which includes a small gasoline engine 12 having a rear support handle 14 secured thereto, an elongated hollow shaft 16 operatively connected at its rear end 18 to engine 12 and having a downwardly curved forward end portion 20, and a rotary cutting head 22 operatively coupled to the downturned portion 20 of the shaft 16. It will be appreciated that the trimmer 10 could be provided with an electric motor instead of the gasoline engine, and that the shaft could be straight instead of curved.

The rotary head 22 includes a spool 24 and a length of flexible filament line 26 carried by the spool for cutting vegetation as the spool rotates. Rotational power is transmitted to the spool 24 by the engine 12 via a flexible drive shaft (not illustrated) which extends through the interior of the shaft 16. The structure and operation of this internal flexible drive shaft, which forms no part of the present invention, are set forth in U.S. Pat. No. 4,451,983.

The present invention provides the trimmer 10 with a unique control handle 30 which is secured to the shaft 16, in a manner subsequently described, along a straight portion thereof disposed somewhat forwardly of the engine 12. During use of the trimmer 10, its operator 32 grasps the rear support handle 14 in one hand 34 while grasping a handgrip portion 36 of the forward control handle 30 with his other hand 38. The control handle 30 is used to support and guide the motion of the shaft 16 to thereby accurately control the movements of the spool 24 and rotating filament 26. As will be seen, the control handle 30 uniquely functions to substantially reduce the amount of shaft vibration transmitted through the handle 30 to its handgrip 36.

Referring now to FIGS. 2 and 3, the handle 30 is of a lightweight molded plastic construction and includes a generally tubular vibration isolation spring section 40 which coaxially circumscribes an axial portion 17 of the shaft 16. Section 40 has a laterally thickened shaft connection end portion 42, a handle connection end portion 44, and a longitudinally intermediate portion 46 extending axially between the connection end portions 42 and 44. As illustrated in FIG. 1, the vibration isolation section 40 is oriented on the shaft 16 so that the shaft connection end portion 42 faces rearwardly toward the engine 12 and the handle connection end portion 44 faces forwardly toward the outer end portion of the shaft. However, if desired, this orientation of section 40 on the shaft may be reversed.

The thickened end portion 42 is provided with an opposed pair of laterally spaced connecting ears 48 which are positioned on opposite sides of an axially extending slot 50 formed in the section 40. Slot 50 extends from the thickened end portion 42 to an axially intermediate portion of the vibration-absorbing section 40, and has, at its inner end, a circularly enlarged portion 52. The end portion 42 of the section 40 is clamped against the shaft 16 by means of a wing nut 54 suitably threaded onto an outer end of a connecting bolt 55 extending through the opposed connecting ears 48. Slot 50 functions to relieve stress in an axial end portion of the section 40 when the connecting ears 48 are drawn together by the wing nut 54.

As illustrated in FIG. 3, from its rigid connection to the shaft 16 at end portion 42, the vibration isolation section 40 is tapered in a rightward and laterally outward direction to thereby create between the shaft portion 17 and the vibration isolation section 40 an annular, tapered clearance space 56 which laterally isolates the portions 44 and 46 of the vibration isolation section 40 from the shaft 16. It can thus be seen that, due to this annular clearance space 56, the vibration isolation section 40 is connected to the shaft 16 in a cantilevered fashion which permits the free portion (i.e., portions 44 and 46) of the vibration isolation section 40 to be laterally flexed into engagement with the shaft portion 17 as representatively illustrated by the dashed lines in FIG. 3. Accordingly, in addition to its vibration isolation characteristics subsequently described, the vibration isolation section 40 functions as a cantilevered spring portion of the handle 30.

Formed integrally with the handle connection end portion 44 of the vibration isolation section 40 is a handgrip connecting section 58 which projects generally laterally upwardly from the vibration isolation section 40. At its lower or inner end, the connecting section 58 encircles the end portion 44, while the upper or outer end of the connecting section 58 has the handgrip portion 36 secured thereto and projecting generally transversely therefrom. It will be appreciated that while the connecting section 58 is utilized in the depicted embodiment of the improved control handle 30 to interconnect a "handgrip" to the vibration isolation section 40 it could also be used to interconnect thereto a grip portion having a different configuration such as a "handlebar" or a "bullhorn". The connecting section 58 and the handgrip 36 may be collectively referred to as a "handgrip section" for simplified reference purposes.

The handgrip 36, which may have a variety of configurations other than that representatively illustrated herein, consists of a hollow cylindrical portion 60 which has a circumferentially spaced series of axially extending exterior surface grooves 61 formed thereon. The exterior surface of portion 60 may be given a suitable non-slip textured coating, or the portion 60 may be inserted into a sleeve (not shown) formed from a suitable cushioning material if desired.

As is best illustrated in FIG. 2, the connecting section 58 is circumferentially tilted slightly to one side to thereby longitudinally center the handgrip 36 over the shaft 16. Additionally, adjacent its inner end, the connecting section 58 curves slightly rearwardly and then, at an upper portion thereof, curves slightly forwardly to the handgrip 36. Along its length, the connecting section 58 has a generally H-shaped cross-section defined by a relatively thin center web portion 64 having formed along its side edges transverse reinforcing flanges 66. Like the handgrip 36, the connecting section 58 could, of course, have a variety of configurations different than that representatively depicted herein.

During operation of the trimmer 10, the shaft 16 is subject to vibration 68 (FIG. 2) which is generally transverse to the axis 70 of the shaft 16. In conventional control handles, in which the handgrip connecting portion is simply rigidly connected at its base to the shaft, a very substantial portion of this shaft vibration is transmitted upwardly through the connecting section to the handgrip and thus to the operator's hand 38.

However, in the handle 30 of the present invention, this transverse shaft vibration 68 is not transmitted directly from the rigid handle connection area 42 to the handgrip connecting section 58. Instead, such vibration is transmitted first to the cantilevered vibration isolation section 40 which, due to its lateral flexure capability, absorbs and damps a substantial portion of the shaft vibration received thereby before it can be transmitted to the handgrip connecting section 58. Accordingly, shaft vibration ultimately transmitted to the handgrip 36 via the connecting section 58 is greatly reduced in the present invention. Thus, the vibration isolation section 40, which functions as a cantilevered spring element interposed between the handle's rigid shaft connection area 42 and the handgrip connecting section 58, uniquely functions as a vibration buffer element to isolate the handgrip 36 from objectionable vibration. This significantly improves the operator's forward control hand comfort while utilizing the trimmer 10, even during extended operating periods.

As previously mentioned, during normal operation of the trimmer 10, except for its connection end portion 42, the vibration-isolation section 40 of the handle 30 is laterally isolated from the axial shaft section 17 and may be laterally flexed to a limited degree relative to the shaft. More specifically, when only normal, relatively light hand control forces are exerted on the handle 30 this isolation is maintained. However, when it is necessary to exert a stronger hand force on the handle 30, in order to exert a stronger control force on the shaft 16, the vibration isolation section 40 may be laterally flexed to the extent that it engages the shaft section 17 to thereby exert a direct hand force on the shaft. In this instance, the shaft 16 acts as a stop to limit lateral flexure of the vibration isolation section 40. This stop feature functions to automatically limit bending stress imposed on the section 40 to prevent inadvertent breakage thereof.

In addition to absorbing a very substantial portion of the shaft vibration before it can be transmitted to the handgrip 36, the cantilevered vibration isolation section 40 also functions as an important safety enhancement in the handle 30. Specifically, if during operation of the tool 10 the forward rigid connecting area 42 of the handle were to break, the balance of the vibration-absorbing section would still maintain the important connection between the handgrip 36 and the shaft 16, the remaining portion of the section 40 acting as a safety connection collar which circumscribes the shaft 16 and maintains at least a limited degree of forward hand control of the shaft 16 until the engine 12 can be turned off. In the same manner, even if an intermediate portion of the vibration isolation section 40 breaks, this limited degree of forward hand shaft control would still be maintained by a forward axial portion of the section 40.

Illustrated in FIGS. 4–7 is an alternate embodiment 30$_a$ of the control handle 30 in which elements similar to those in handle 30 have been given the same reference numerals, but with the subscript "a". Unlike the vibration isolation section 40 of handle 30, the section 40$_a$ of handle 30$_a$ has a non-circular cross-section along its length defined by a rounded upper portion 72, a pair of flat opposite side portions 74 which taper inwardly toward the shaft connection end portion 42$_a$, and a flattened bottom side portion 76. Formed along the shaft connection end portion 42$_a$ are a pair of downwardly extending connection ears 48$_a$ which are positioned along the opposite sides of a generally V-shaped compression stress relief slot 50$_a$ which extends axially along the bottom side portion 76 of the section 40$_a$. A wing nut 54$_a$ is threaded onto the outer end of a connecting bolt 55$_a$ extending through appropriate openings formed in the connecting ears 48$_a$ to clamp the connection end portion 42$_a$ to the shaft 16.

The shaft connection end portion 42$_a$ has, around its circumference, a generally H-shaped cross section defined by laterally spaced inner and outer concentric flange portions 78, 80 interconnected by a central web portion 82. The inner end of the handgrip connecting section 58$_a$, which encircles the shaft end connection portion 44$_a$ of the vibration isolation section 40$_a$, has a similarly H-shaped cross section and defines adjacent the open right end of the vibration isolation section 40$_a$ an annular internal ledge 82. The handgrip connecting section 58$_a$ has a pair of circumferentially spaced, curved support arm portions 84 which, at their upper ends, are secured to opposite ends of the handgrip 36$_a$.

Figure 6:
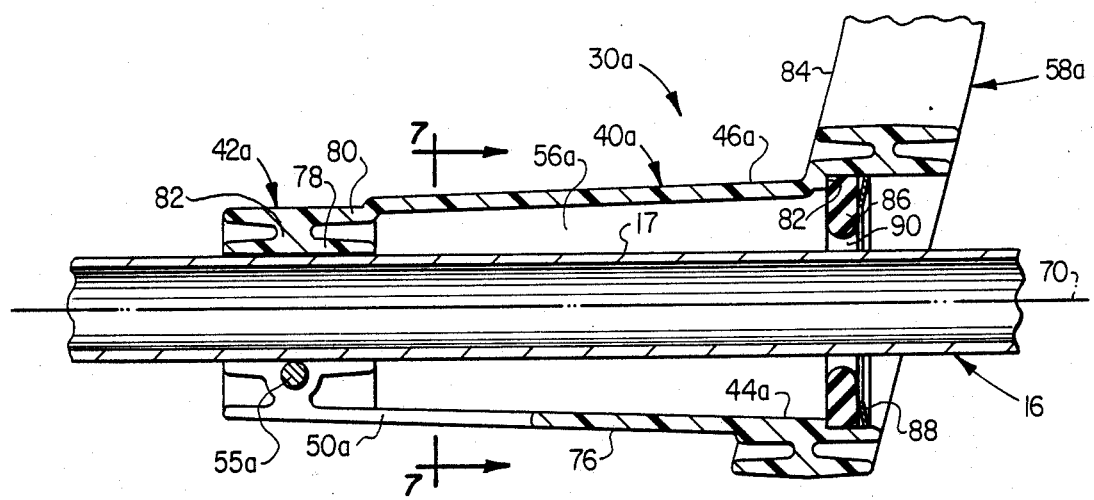
FIG. 6 is a fragmentary cross-sectional view through the handle of FIG. 4, and a portion of the power tool shaft to which it is connected, taken along line 6—6 of FIG. 4.
Figure 7:
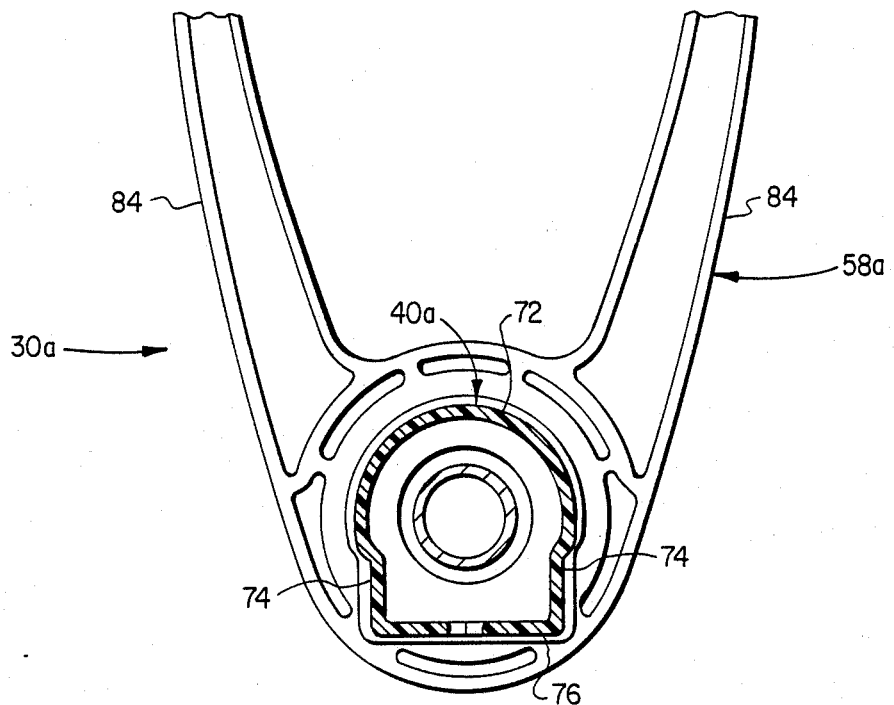
FIG. 7 is a cross-sectional view through the handle of FIG. 4, taken along line 7—7 of FIG. 6.

As can best be seen in FIG. 6, the lateral clearance space 56$_a$ between the shaft portion 17 and the cantilevered vibration isolation section 40$_a$ is considerably wider than its counterpart clearance space 56 in the handle 30. The handle 30$_a$ is provided with an annular, resilient cushioning or stop member 86 which is positioned within the end connection portion 44$_a$ and abuts around its periphery the annular ledge 82. The stop member 86 is held in position within the connection portion 44$_a$ by means of a metal split retaining ring 88 which is press-fitted into the connection portion 44$_a$ and bears against the rightwardly facing side surface of the resilient stop member 86. The inner diameter of stop member 86 is somewhat larger than the outer diameter of the shaft 16, thereby defining between the stop member 86 and the shaft 16 an annular clearance space 90.

During operation of the trimmer 10, the cantilevered vibration isolation section 40$_a$ functions in the same manner as section 40 of the handle 30 to absorb transverse shaft vibration to thereby insulate the handgrip 36 from such vibration. However, when the cantilevered portion of the vibration isolation section 40$_a$ is laterally flexed toward the shaft 16, the stop member 86 engages the shaft to resiliently resist further lateral flexure of section 40$_a$ and to prevent direct contact between the cantilevered portion thereof and the vibrating shaft. In this bottomed-out position of the vibration isolation section 40$_a$ the resilient member 86 serves to absorb shaft vibration which would otherwise be directly transmitted to the handle connecting section 58$_a$ through the handle connection end portion 44$_a$ of section 40$_a$. Accordingly, the resilient stop member functions to further limit shaft vibration ultimately transmitted to the operator handgrip 36$_a$. In all other regards the handle 30$_a$ functions in a similar manner to that of the handle 30. It will be appreciated that the resilient stop member 86 could be secured to the end connection portion 44$_a$ in a variety of alternate manners.

Figure 8:
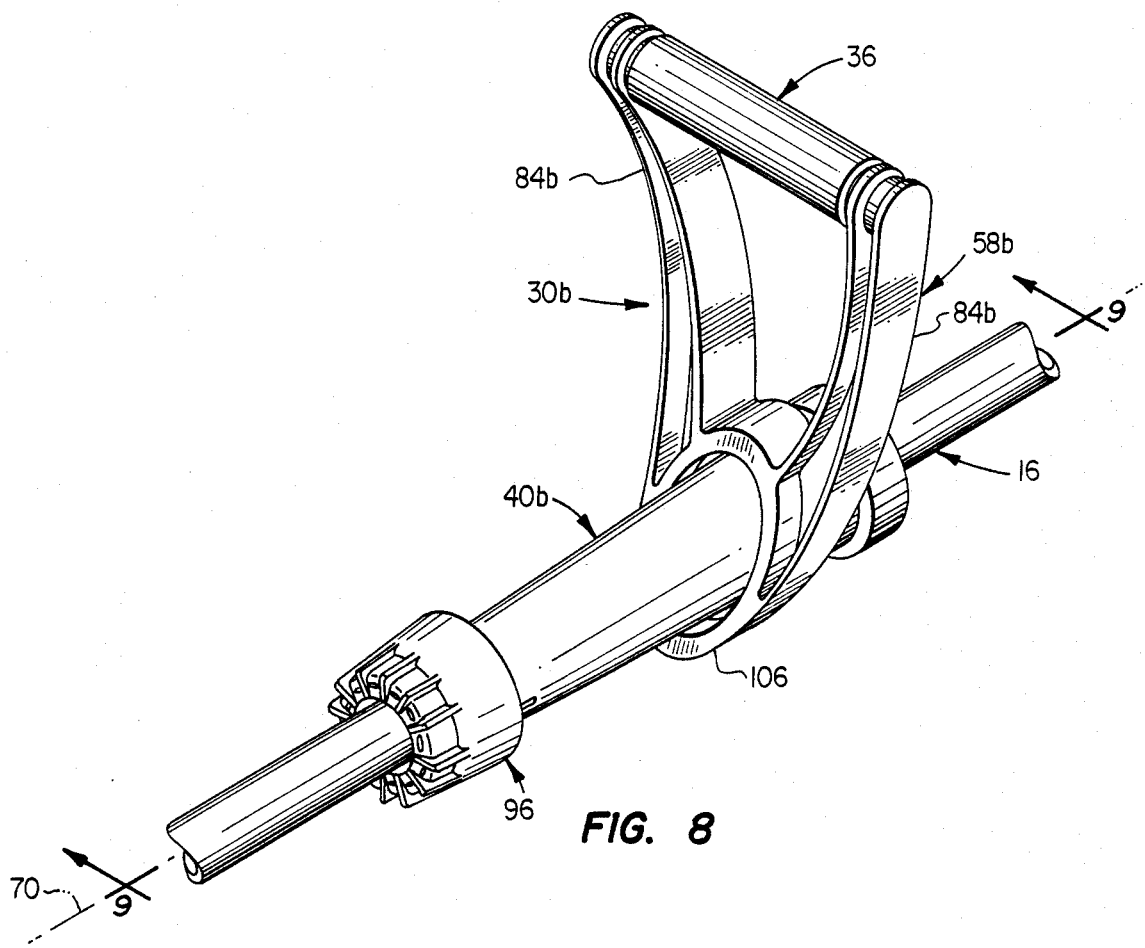
FIG. 8 is a perspective view similar to that of FIG. 4, illustrating a further alternate embodiment of the control handle.
Figure 9:
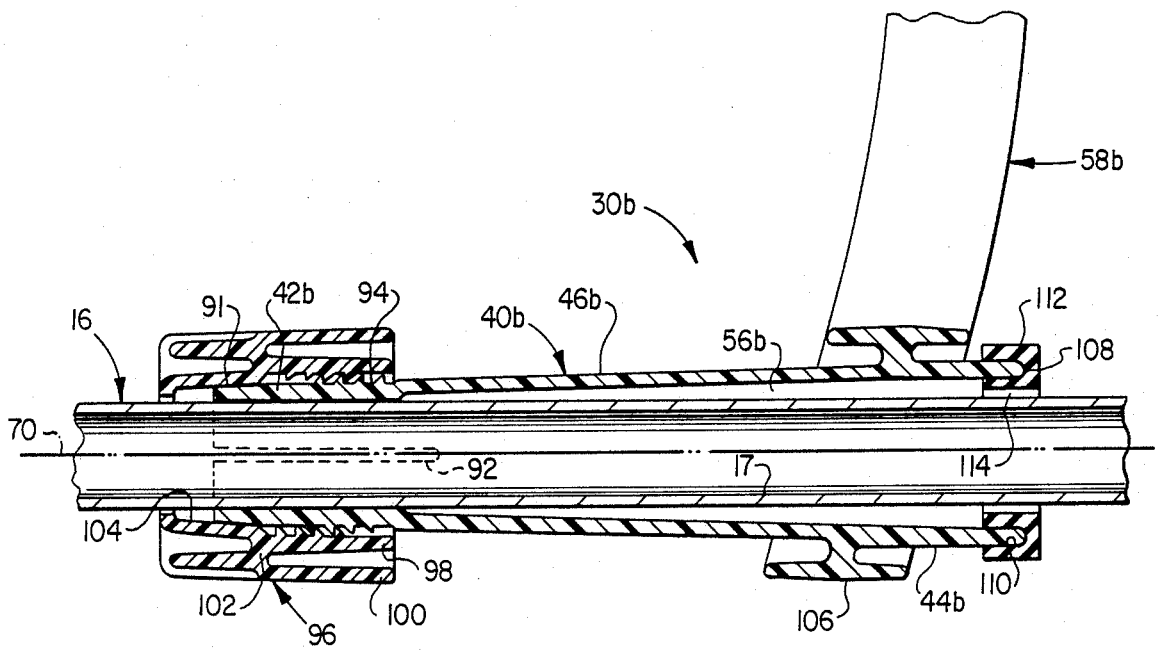
FIG. 9 is an enlarged scale fragmentary cross-sectional view through the control handle of FIG. 8, and a portion of the power tool shaft to which it is connected, taken along line 9—9 of FIG. 8.
Figure 10:
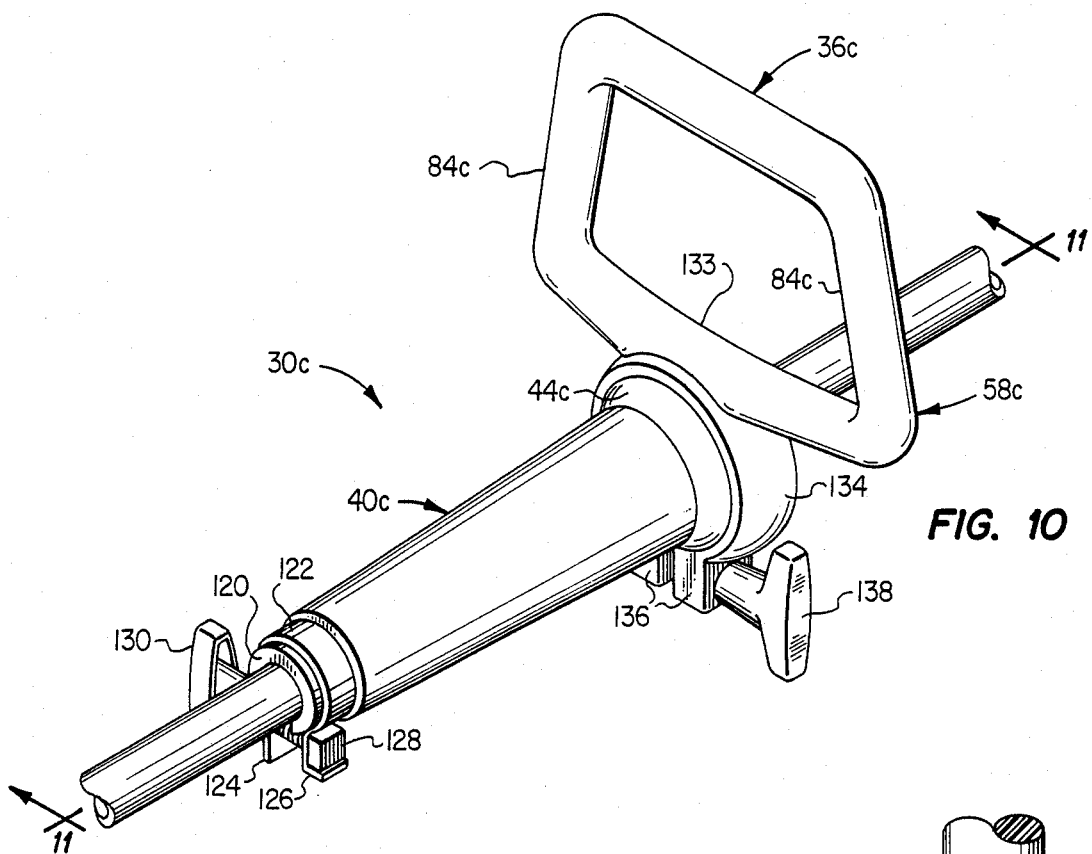
FIG. 10 is a perspective view similar to that of FIG. 8, illustrating a further alternate embodiment of the control handle.
Figure 11:
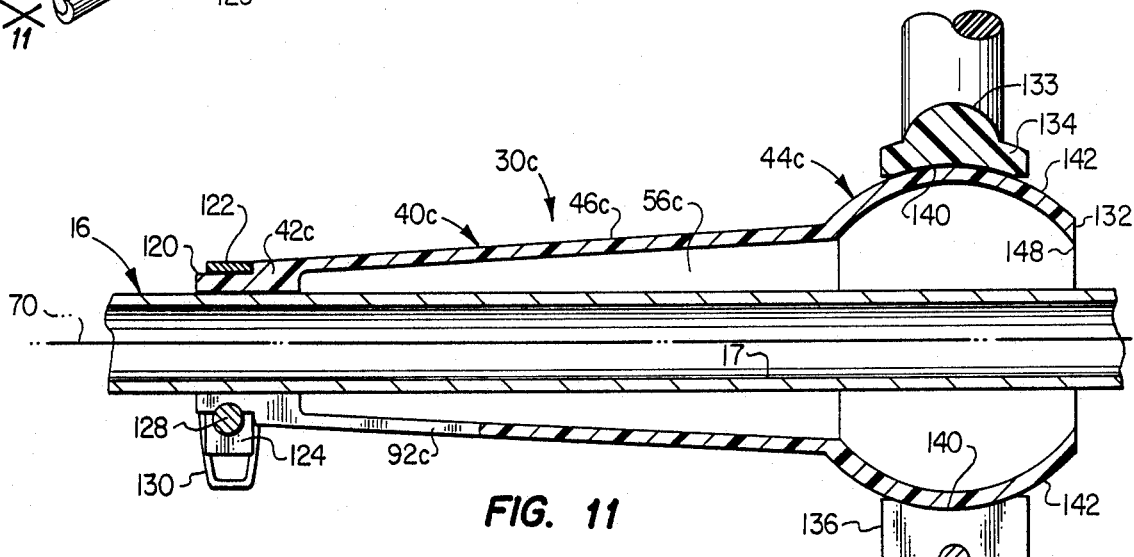
FIG. 11 is an enlarged scale fragmentary cross-sectional view through the control handle of FIG. 10, and a portion of the power tool shaft to which it is connected, taken along 11—11 of FIG. 10.
Figure 12:
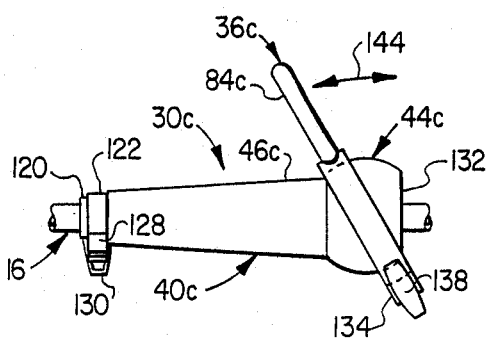
FIGS. 12 and 13, respectively, are reduced scale side elevational and top plan views of the handle of FIG. 10 illustrating the positional adjustability of its handgrip portion relative to its vibration isolation section, FIG. 13 being partially sectioned.
Figure 13:
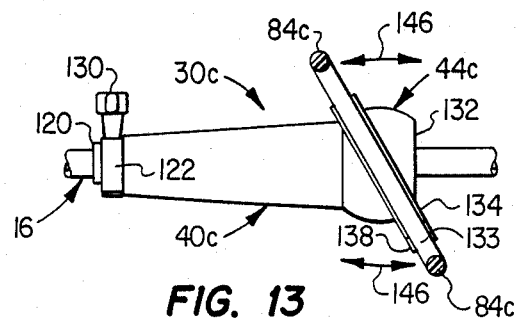

Illustrated in FIGS. 8 and 9 is a further alternate embodiment 30$_b$ of the handle 30 in which similar components are given the same reference numerals, but with the subscript "b". The vibration isolation section 40$_b$ of the handle 30$_b$ has, along its length, a circular cross-section which defines with the shaft portion 17 a tapered, relatively narrow annular clearance space 56$_b$. The shaft connection end portion 42$_b$ has a tapered exterior end surface portion 91, a pair of narrow, axially extending compression stress relief slots 92 on opposite sides thereof, and an exteriorly threaded portion 94 positioned inwardly of the tapered surface 91.

The shaft connection end portion 42$_b$ of the vibration isolation section 40$_b$ is clamped to the shaft 16 by means of a molded plastic annular clamping collar 96 which has, around its periphery, a generally H-shaped cross-section defined by laterally spaced concentric inner and outer flange portions 98, 100 connected at axially central portions thereof by an annular web portion 102. The portion of the inner flange 98 to the right of the connecting web 102 is interiorly threaded and screwed onto the exterior threads 94 of the connection end portion 42$_b$. The portion of the inner flange 98 to the left of the connecting web 102 is provided with a tapered interior surface 104 which engages the tapered surface 91 as the collar 96 is being tightened onto the connection end portion 42$_b$ to cause the end portion 42$_b$ to be pressed inwardly against the shaft 16.

The handgrip connecting section 58$_b$ is shaped substantially identically to the connecting section 58$_a$ of handle 30$_a$ except that its annular inner end portion 106 encircles and is secured to the rear connection end portion 44$_b$ slightly inwardly from the annular outer end 108 of the connection portion 44$_b$. The projecting annular outer end portion 108 of the vibration isolation section 40$_b$ is received in a suitable annular side surface slot 110 formed in an annular resilient cushioning member 112 which also encircles the shaft 16. The inner diameter of the cushioning member 112 is slightly larger than the outer diameter of the shaft 16, thereby creating an annular clearance space 114 between the cushioning member 112 and the shaft 16. In a manner similar to that of the cushioning member 86 on handle 30$_a$, the cushioning member 112 defines a resilient stop between the handle connection portion 44$_b$ of the vibration isolation section 40$_b$ and the shaft 16. When a hand grip force sufficient to bottom the cushioning member 112 out against the shaft 16 occurs, the cushioning member 112 similarly serves to reduce the shaft vibration transmitted to the hand grip connecting section 58$_b$ through the rear end connection portion 44$_b$.

Illustrated in FIGS. 10–13 is a further alternate embodiment 30$_c$ of the handle 30 in which similar components are given the same reference numerals, but with the subscript "c". The vibration isolation section 40$_c$ of the handle 30$_c$ has, along its length, a circular cross-section which defines with the shaft portion 17 a tapered, relatively narrow annular clearance space 56$_c$. The shaft connection end portion 42$_c$ has a reduced diameter outer end portion 120 which is received in a removable metal clamping band having at outer ends thereof connecting tab portions 124 and 126. A connecting bolt 128 is extended through openings formed in the tabs 124, 126 and is received in a tightening wing nut member 130 which is operative to draw the connecting tabs 124, 126 together to clamp the shaft connection end portion 42$_c$ to the shaft 16. In a manner similar to that described for other handle embodiments herein, the vibration isolation section 40$_c$ is provided along the underside thereof with a compression stress relief slot 92$_c$ (FIG. 11) which extends through the shaft connection end portion 42$_c$ into the longitudinally intermediate portion 46$_c$ of the vibration isolation section 40$_c$.

The handle connection end portion 44$_c$ of the vibration isolation section 40$_c$ is transversely enlarged relative to the balance of section 40$_c$ and has a hollow, truncated spherical configuration with an open outer end 132.

The operator handgrip portion 36$_c$ of the handle 30$_c$ is removably connected to the generally spherical handle connection end portion 44$_c$ by a handgrip connecting section 58$_c$ which comprises a pair of arm portions 84$_c$ that extend generally downwardly from the outer ends of the handgrip portion 36$_c$, and a generally horizontally extending arm portion 133 which interconnects the lower ends of the arms 84$_c$. Molded integrally with a central portion of the connecting arm 133 is a generally annular, split clamping band 134 having a pair of spaced apart, radially outwardly projecting connecting ear portions 136. The diameter of the clamping band 134 is dimensioned so that the handle connection end portion 44$_c$ can be inserted into the band 134 and clamped therein by means of a suitable thumbscrew member 138 which is threaded into appropriate openings formed through the connecting ears 136. As may best be seen in FIG. 11, the radially inner surface 140 of the clamping band 134 is given a concave curvature which is complementary to the convex spherical curvature of the outer surface 142 of the handle connecting end portion 44$_c$.

The complementary curvatures on the surfaces 140, 142 permit the band 134 to be clamped onto the spherical end section 44$_c$ in a wide variety of positions relative thereto, in any of such positions the outer surface 142 being firmly frictionally engaged by essentially the entire area of the complimentarily curved inner surface 140 of the band 134.

This uniquely permits the handgrip 36$_c$ to be selectively positioned in a wide variety of orientations relative to the vibration isolation section 40$_c$ and thus to the shaft 16. For example, as indicated by the double-ended arrow 144 in FIG. 12, simply by loosening the thumbscrew 138, re-orienting the clamping band 134 relative to the spherical connection end portion 44$_c$, and then re-tightening the thumbscrew 138, the handgrip 36$_c$ may be repositioned forwardly or rearwardly along the axis of the shaft 16. Similarly, as indicated by the double-ended arrows 146 in FIG. 13, in this same manner a side-to-side adjustment of the handgrip 36$_c$ may be effected to selectively vary its angular relationship with the shaft 16. Moreover, if desired, the rotational orientation of the handgrip 36$_c$ relative to the shaft 16 can also be selectively varied so that the handgrip 36$_c$ is, for example, positioned to one side of the shaft 16 instead of directly above the shaft during use of the trimmer 10. Any or all of these positional adjustments of the handgrip 36$_c$ may, of course, be quickly and easily made while the vibration isolation section 40$_c$ is still firmly clamped to the shaft 16. Coupled with the ability to move the vibration isolation section 40$_c$ along the shaft 16 to a desired axial location thereon, the nearly infinitely adjustable handgrip section provides the handle 30$_c$ with a unique ability to be adjusted to suit a wide variety of operators and uses of the trimmer 10.

As in the case of the previously described control handles, the vibration isolation section 40$_c$ of the handle 30$_c$ absorbs and damps shaft vibration transmitted to the shaft connection end portion 42$_c$ to isolate the handgrip 36$_c$ from a very substantial portion of such vibration.

Additionally, the vibration isolation section 40$_c$ may be laterally flexed relative to the shaft 16 during use of the trimmer 10. As can best be seen in FIG. 11, the open outer end 132 of the handle connection end portion 44$_c$ has a radially inner circular edge portion 148 which is radially positioned relative to the shaft 16 to act as a stop portion for engaging the shaft to thereby limit such lateral flexure of the vibration isolation section 40$_c$.

From the foregoing it can be seen that the present invention provides substantially improved control handle apparatus for the trimmer 10 which markedly reduces the transverse shaft vibration transmitted to the operator handgrip portion of the control handle, the vibration being uniquely absorbed within the cantilever spring means defined by the handle's vibration isolation section. Additionally, this vibration isolation section, which encircles the shaft, provides an added measure of safety to the control handle in the event that the handle clamping mechanism breaks during operation of the trimmer, or even if a portion of the vibration isolation section itself is broken. The improved handle, in its various depicted embodiments, is light in weight, relatively inexpensive to produce, provides substantially improved operator hand comfort, and may be easily and quickly adjusted to different positions along the shaft to selectively adjust the overall balance of the tool and the handle-to-handle length to suit various operators of the tool.

While the vibration-damping control handle of the present invention has been illustrated and described in conjunction with a flexible line trimmer, it will be appreciated that it may also advantageously be incorporated into a wide variety of rotary power tools of other types, such as lawn edgers, brush cutters, snow blowers and the like, as well as a variety of non-rotary portable power tools.

The foregoing detailed description is to be clearly understood as given by way of illustration and example only, the spirit and scope of the present invention being limited solely by the appended claims.

What is claimed is:

1. A power tool comprising:
   a portion subject to vibration in a direction generally transverse to an axis during operation of said power tool; and
   handle means, adapted to be grasped by an operator of said power tool, for supporting and controlling the motion of said power tool, said handle means including:
   cantilever spring means for receiving and absorbing vibration, said cantilever spring means having first and second longitudinally spaced connection areas and an intermediate portion extending between said connection areas,
   means for securing said first connection area of said cantilever spring means to said portion of said power tool in a manner such that the balance of said cantilever spring means, including said intermediate portion and second connection area thereof, is isolated from and cantilevered with respect to said portion of said power tool, said intermediate portion of said cantilever spring means extends generally parallel to said axis, and said portion of said power tool defines a stop for limiting lateral flexure of said cantilever spring means,
   a handgrip adapted to be grasped by an operator of said power tool, and means for securing said handgrip to said second connection area of said cantilever spring means.

2. The power tool of claim 1 wherein said means for securing said handgrip comprise a handgrip connecting section projecting outwardly from said cantilever spring means at an angle relative thereto, said handgrip being secured to said handgrip connecting section in a spaced relationship with said cantilever spring means.

3. The power tool of claim 2 wherein said handgrip connecting section is formed integrally with said cantilever spring means.

4. The power tool of claim 2 wherein said handgrip connecting section is positionally adjustable relative to said cantilever spring means.

5. The power tool of claim 1 wherein said portion of said power tool is a shaft, and said cantilever spring means circumscribe an axial portion of said shaft.

6. The power tool of claim 5 wherein said means for securing said first connection area comprise means for releasably clamping said first connection area to said shaft at a predetermined location thereon.

7. The power tool of claim 5 further comprising a resilient stop member connected to said cantilever spring means adjacent said second connection area thereon and positioned to engage said shaft during lateral flexure of said cantilever spring means.

8. A power tool comprising:
a shaft subject to vibration in a direction generally transverse to its axis during operation of said power tool; and
handle means, adapted to be grasped by an operator of said power tool, for supporting and controlling the motion of said power tool, said handle means including:
cantilever spring means, circumscribing an axial portion of said shaft, for receiving and absorbing vibration, said cantilever spring means having first and second longitudinally spaced connection areas and an intermediate portion extending between said connection areas,
means for securing said first connection area of said cantilever spring means to said shaft in a manner such that said intermediate portion and second connection area of said cantilever spring means are isolated from said shaft, said intermediate portion of said cantilever spring means extends generally parallel to said axis, and said shaft defines a stop for limiting lateral flexure of said cantilever spring means,
a handgrip adapted to be grasped by an operator of said power tool, and
means for securing said handgrip to said second connection area of said cantilever spring means, said second connection area has a generally spherically curved outer surface and said means for securing said handgrip comprising a handgrip connecting section secured to said handgrip and having clamping means for clamping said handgrip connecting section to said outer surface in a multiplicity of positional orientations relative thereto.

9. The power tool of claim 8 wherein said clamping means include a split annular clamping member having a radially inner surface with a concave curvature complementary to the curvature of said generally spherically curved outer surface of said second connection area.

10. A power tool comprising:
an elongated shaft;
drive means, operatively connected to one end of said shaft, for generating rotational power;
rotationally drivable means operatively connected to the opposite end of said shaft;
means for transmitting rotational power from said drive means to said rotationally drivable means; and
handle means for holding and guiding said shaft, said handle means including:
an elongated, flexible vibration isolation section longitudinally extending generally axially along said shaft,
means for securing a first longitudinal portion of said vibration isolation section to said shaft with a second longitudinal portion of said vibration isolation section, including an outer end thereof, being cantilevered relative to said shaft for lateral flexure relative thereto toward and away from a stopped position in which further lateral flexure of said second longitudinal portion of said vibration isolation section toward said shaft is directly stopped by said shaft, and
a handgrip section secured to said second longitudinal portion of said vibration isolation section at a location thereon longitudinally spaced from said first longitudinal portion.

11. A power tool comprising:
an elongated shaft;
drive means, operatively connected to one end of said shaft, for generating rotational power;
rotationally drivable means operatively connected to the opposite end of said shaft;
means for transmitting rotational power from said drive means to said rotationally drivable means; and
handle means for holding and guiding said shaft, said handle means including:
an elongated, flexible vibration isolation section extending axially along said shaft, said elongated, flexible vibration isolation section coaxially circumscribing said shaft,
means for securing a first longitudinal portion of said vibration isolation section to said shaft with a second longitudinal portion of said vibration isolation section, including an outer end thereof, being cantilevered relative to said shaft for lateral flexure relative thereto, and
a handgrip section secured to said longitudinal portion of said vibration isolation section at a location thereon longitudinally spaced from said first longitudinal portion.

12. The power tool of claim 10 wherein said drive means comprises an internal combustion engine.

13. The power tool of claim 10 wherein said drive means comprise an electric motor.

14. The power tool of claim 10 wherein said means for securing comprise means for releasably clamping said first longitudinal portion of said vibration isolation section to said shaft at a predetermined location thereon.

15. The power tool of claim 14 wherein said means for releasably clamping comprise screw means carried by said first longitudinal portion of said vibration isolation section.

16. The power tool of claim 14 wherein said first longitudinal portion of said vibration isolation section is externally threaded, and said means for releasably clamping comprise an internally threaded annular clamping collar threadable onto said first longitudinal portion of said vibration isolation section.

17. The power tool of claim 10 wherein said vibration isolation section and said handgrip section are integral with one another.

18. The power tool of claim 17 wherein said vibration isolation section and said handgrip section are of a molded plastic material.

19. A power tool comprising:
an elongated shaft;
drive means, operatively connected to one end of said shaft, for generating rotational power;
rotationally drivable means operatively connected to the opposite end of said shaft;
means for transmitting rotational power from said drive means to said rotationally drivable means; and
handle means for holding and guiding said shaft, said handle means including:
an elongated flexible vibration isolation section extending axially along said shaft,
means for securing a first longitudinal portion of said vibration isolation section to said shaft with a second longitudinal portion of said vibration isolation section, including an outer end thereof, being cantilevered relative to said shaft for lateral flexure relative thereto, and
a handgrip section secured to said second longitudinal portion of said vibration isolation section at a location thereon longitudinally spaced from said first longitudinal portion; and
resilient stop means, connected to said vibration isolation section, for engaging said shaft upon lateral flexure of said vibration isolation section.

20. The power tool of claim 19 wherein said second longitudinal portion of said vibration isolation section has an annular outer end portion, and said resilient stop means comprise an annular resilient cushioning member having a circular side surface slot formed therein that receives said annular outer end portion of said second longitudinal portion of said vibration isolation section.

21. The power tool of claim 19 wherein said resilient stop means comprise an annular resilient cushioning member positioned within said second longitudinal portion of said vibration isolation section.

22. The power tool of claim 21 wherein said second longitudinal portion of said vibration isolation section has an annular interior shoulder formed therein, said cushioning member has a side surface portion which engages said shoulder, and said handle means further comprise a retaining ring member disposed within said second longitudinal portion of said vibration isolation section and holding said cushioning member against said interior shoulder.

23. The power tool of claim 10 wherein said handgrip section comprises a handgrip connecting section projecting generally laterally outwardly from said vibration isolation section, and an operator handgrip secured to an outer end portion of said handgrip connecting section.

24. The power tool of claim 10 wherein said handgrip section is positionally adjustable relative to said vibration isolation section.

25. The power tool of claim 24 wherein said handgrip section is adjustably securable to an outer end portion of said second longitudinal portion of said vibration isolation section.

26. A power tool comprising:
an elongated shaft;
drive means, operatively connected to one end of said shaft, for generating rotational power;
rotational drivable means operatively connected to the opposite end of said shaft;
means for transmitting rotational power from said drive means to said rotationally drivable means; and
handle means for holding and guiding said shaft, said handle means including:
an elongated vibration isolation section extending axially along said shaft,
means for securing a first longitudinal portion of said vibration isolation section to said shaft with a second longitudinal portion of said vibration isolation section being laterally outwardly spaced from said shaft, and
a handgrip section secured to said second longitudinal portion of said vibration isolation section at a location thereon longitudinally spaced from said first longitudinal portion;
said handgrip section being positionally adjustable relative to said vibration isolation section and adjustably securable to an outer end portion of said second longitudinal portion of said vibration isolation section;
said outer portion having a generally spherically curved outer surface, and said handgrip section having a split annular clamping band portion having a radially inner surface complimentarily curved relative to said outer surface and adapted to be clamped to said outer surface in a multiplicity of positional orientations thereon.

27. The power tool of claim 26 wherein said vibration isolation section coaxially circumscribes an axial portion of said shaft.

28. Vibration isolation handle apparatus connectable to a shaft subject to vibration comprising:
a generally tubular, laterally flexible vibration isolation section having a first and second opposite end portions;
means for securing said first end portion of said vibration isolation section to said shaft with the balance of said vibration isolation section, including said second end portion, circumscribing said shaft and being laterally spaced apart therefrom in a cantilevered relationship therewith;
a handgrip section adapted to be manually grasped; and
means for securing said handgrip section to said second end portion of said vibration isolation section, whereby a substantial portion of the shaft vibration transmitted to the cantilevered vibration isolation section will be absorbed therein to thereby substantially diminish shaft vibration received by said handgrip section.

29. The handle apparatus of claim 28 wherein said handgrip section is formed integrally with and projects generally laterally outwardly from said vibration isolation section.

30. The handle apparatus of claim 28 further comprising means defining a resilient stop surface positioned between said shaft and said vibration isolation section.

31. The handle apparatus of claim 30 wherein said means defining a resilient stop surface comprise a resilient cushioning member carried by said vibration isolation section.

32. The handle apparatus of claim 31 wherein said resilient cushioning member is secured to said second end portion of said vibration isolation section.

33. The handle apparatus of claim 28 wherein said means for securing said handgrip section are operative to permit selective positional adjustment of said handgrip section relative to said second end portion of said vibration isolation section.

34. Vibration isolation handle apparatus connectable to a shaft subject to vibration comprising:
 a generally tubular, laterally flexible vibration isolation section having first and second opposite end portions;
 means for securing said first end portion of said vibration isolation section to said shaft with the balance of said vibration isolation section circumscribing said shaft and being laterally spaced apart therefrom;
 a handgrip section adapted to be manually grasped; and
 means for securing said handgrip section to said second end portion of said vibration isolation section, whereby a substantial portion of the shaft vibration transmitted to said vibration isolation section will be absorbed therein to thereby substantially diminish shaft vibration received by said handgrip section,
 said means for securing said handgrip section being operative to permit selective positional adjustment of said handgrip section relative to said second end portion of said vibration isolation section,
 said second end portion of said vibration isolation section having a generally spherically curved outer surface, and said means for securing said handgrip section including a generally annular clamping band having a radially inner surface adapted to engage said outer surface and having a curvature generally complementary thereto.

35. A method of isolating the handgrip section of a power tool handle free from vibration of a shaft portion of the tool to which the handle is secured at a connection area thereon, said vibrations being generally transverse to an axis, said method comprising the steps of:
 separating said handgrip section from said connection area with an elongated, laterally flexible vibration isolation section of said handle which is longitudinally interconnected between said handgrip section and said connection area, and extends generally parallel to said axis in a cantilevered relationship with said shaft portion of the tool;
 providing said vibration isolation section with a generally tubular configuration; and
 inserting said shaft portion through said vibration isolation section.

36. The method of claim 35 further comprising the step of connecting a resilient stop member to said vibration isolation section adjacent the juncture of said vibration isolation section and said handgrip section.

37. The method of claim 35 further comprising the step of connecting said handgrip section to said vibration isolation section in a manner permitting selective positional adjustment therebetween.

* * * * *